US007481960B2

(12) United States Patent
Ward

(10) Patent No.: US 7,481,960 B2
(45) Date of Patent: Jan. 27, 2009

(54) MOBILE STRAW BEAM FABRICATOR

(75) Inventor: David Ward, Ashland, OR (US)

(73) Assignee: Ashland School of Environmental Technology, Ashland, OR (US)

( * ) Notice: Subject to any disclaimer, the term of this patent is extended or adjusted under 35 U.S.C. 154(b) by 248 days.

(21) Appl. No.: 10/908,717

(22) Filed: May 24, 2005

(65) Prior Publication Data

US 2006/0022373 A1 Feb. 2, 2006

Related U.S. Application Data

(60) Provisional application No. 60/592,558, filed on Aug. 2, 2004.

(51) Int. Cl.
*B28B 23/00* (2006.01)
*B28B 23/14* (2006.01)
*A01F 15/00* (2006.01)
*A01F 15/08* (2006.01)
*A01F 15/14* (2006.01)

(52) U.S. Cl. .......................................... 264/333; 100/8

(58) Field of Classification Search ................ 264/333; 100/8

See application file for complete search history.

(56) References Cited

U.S. PATENT DOCUMENTS 2,627,714 A * 2/1953 Freeman, Jr. et al. .......... 56/341
4,327,537 A * 5/1982 Wolrab ............................ 56/1
4,399,745 A 8/1983 Jorgensen et al. .............. 100/2
4,451,322 A 5/1984 Dvorak ....................... 156/461
5,498,469 A 3/1996 Howard et al. .............. 428/218
5,729,936 A 3/1998 Maxwell .................... 52/220.2
5,730,830 A 3/1998 Hall .......................... 156/468
5,932,038 A 8/1999 Bach et al. ................. 156/62.2
5,945,132 A 8/1999 Sullivan et al. ............ 425/143
6,209,284 B1 4/2001 Porter ....................... 52/794.1
6,596,209 B2 7/2003 Uhland et al. .............. 264/115

FOREIGN PATENT DOCUMENTS

CA 2312657 A1 * 12/2000

* cited by examiner

*Primary Examiner*—Monica A Huson
*Assistant Examiner*—Patrick Butler
(74) *Attorney, Agent, or Firm*—Timothy E. Siegel Patent Law, PLLC

(57) ABSTRACT

An apparatus for producing a cemented product from agricultural waste. The apparatus is comprised of a wheeled, moveable frame that holds a capturer adapted to capture a portion of the agricultural waste product onto the frame, an aligner, mounted on the frame, that is adapted to align the longitudinal agricultural waste products into rows, a binder that is adapted to bind the aligned waste products together, and a finisher that adds a cementatious material to the bound waste product, creating a cemented product.

7 Claims, 7 Drawing Sheets

MOBILE STRAW BEAM FABRICATOR

RELATED APPLICATION

This application claims priority from provisional application Ser. No. 60/592,558 filed Aug. 2, 2004.

BACKGROUND OF THE INVENTION

Finding a beneficial use for the large quantities of agricultural waste material produced in the world has been a pursuit of interest to agriculturalists for a very long time. Although many clever innovations have been made, there is still a problem of disposing of this waste in a useful manner. Additionally, there is a constant search for inexpensive building materials. Again, although much progress has been made in this area, there is still a need for additional options in construction materials.

The structural qualities of straw, in its natural undamaged form, provide significant compressive strength. Compressive strength is precisely the type of strength needed in building materials that are used to support heavy loads. In the prior art the structural integrity of the stalks is lost in two ways. First, in the way the straw is bailed for transportation to the building material fabrication facility and, second, in the way the straw is processed into building material. First, in the prior art the method of bailing straw crushes and breaks the straw stalks so that its natural integrity is injured before even beginning the processing phase. Second, when the straw is processed into building materials it is compressed into a dense mass under heat and pressure. In the process the straw is further crushed, hence further losing its natural structural integrity which, in turn, results in the loss of the straw's natural compressive strength. Accordingly, building materials made from straw, under the prior art, are not capable of supporting the necessary weight without the addition of wood as a framing material, or as a skin applied to a straw panel to give it strength. In addition to preserving compressive strength, maintaining the structural integrity of the straw, by not crushing it, also allows for retention of its natural hollow core which has significant insulation value.

SUMMARY

In a first separate aspect, the present invention is a method for creating a building material that makes use of a wheeled, moveable apparatus that moves through a field of agricultural waste product, capturing a portion of the waste product onto the apparatus, aligning the captured waste products parallel to each other into rows, and binding, through the addition of cementatious material, the aligned waste product together to create a cemented product.

In a second separate aspect, the present invention is an apparatus for producing a cemented product from agricultural waste. It is comprised of a wheeled, moveable frame that includes a capturer adapted to capture a portion of the agricultural waste product onto the frame, an aligner, mounted on the frame, that is adapted to align the longitudinal agricultural waste products into rows, a binder that is adapted to bind the aligned waste products together, and a finisher that adds a cementatious material to the bound waste product, creating a cemented product.

In a third separate aspect, the present invention is a method for producing a structural product from longitudinal agricultural waste product pieces, each having a natural structure. The method consists of arranging the pieces so that they all have the same orientation, compressing the pieces together in a way that preserves their natural structure, binding the pieces together, and placing cementatious material about the bound pieces.

The foregoing and other objectives, features and advantages of the invention will be more readily understood upon consideration of the following detailed description of the preferred embodiment(s), taken in conjunction with the accompanying drawings.

DETAILED DESCRIPTION OF THE PREFERRED EMBODIMENT(S)

Figure 1:
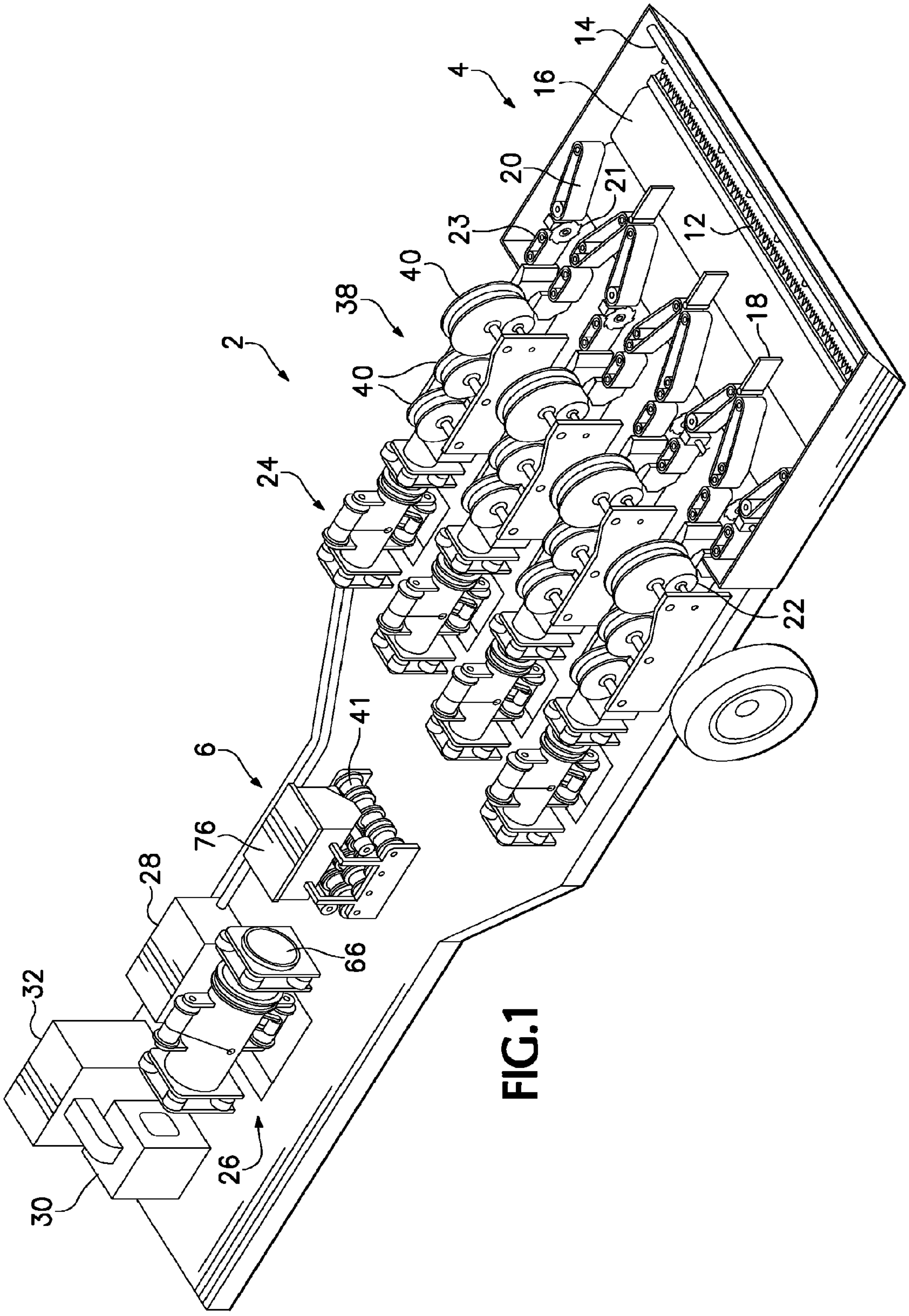
FIG. 1 is a perspective of a mobile straw beam fabricator according to a preferred embodiment of the present invention.
Figure 2:
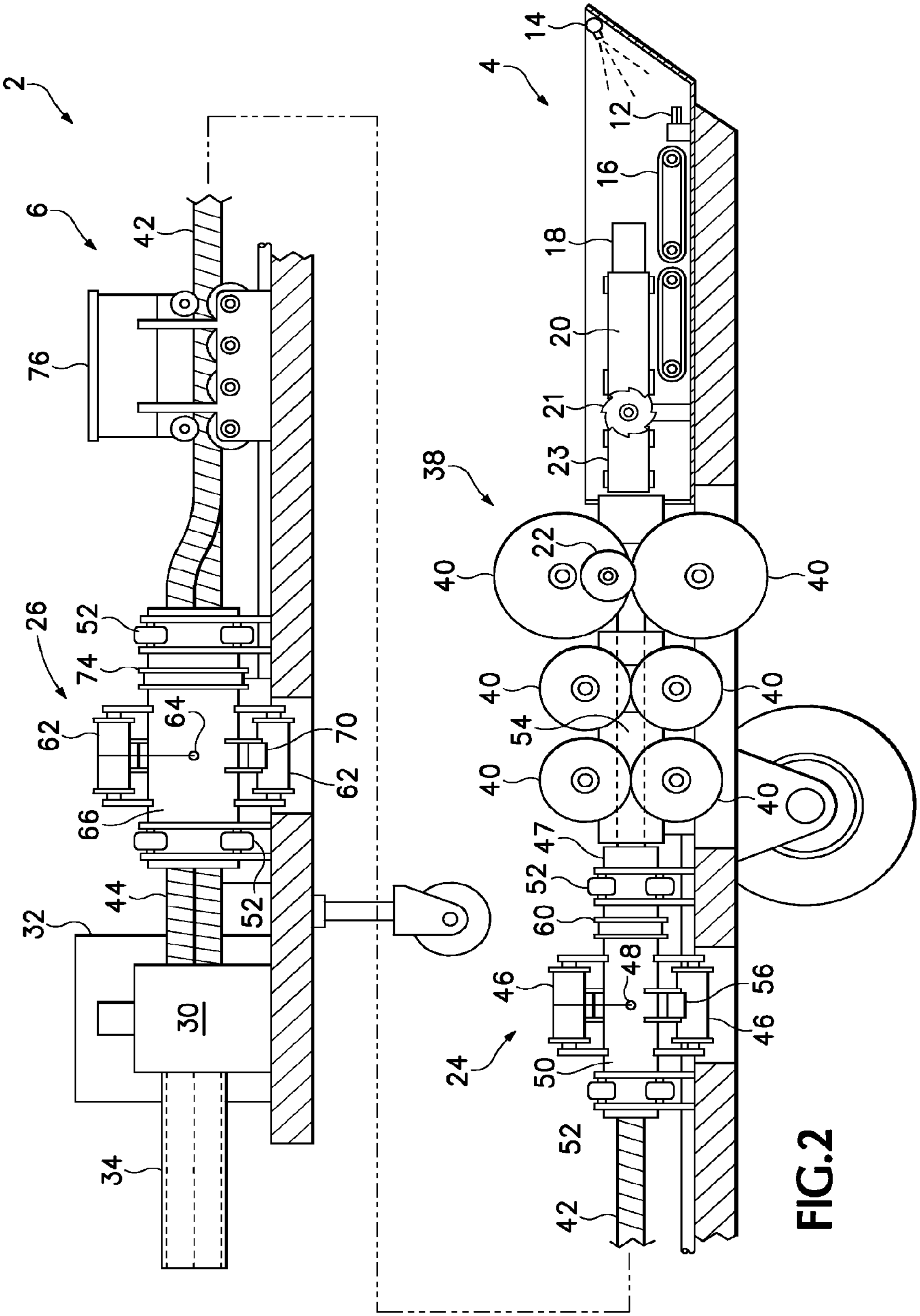
FIG. 2 is a side perspective of a mobile straw beam fabricator of FIG. 1 showing a front portion of the fabricator on the bottom part of the drawing, and a rear portion of the fabricator on the top part of the drawing.
Figure 3:
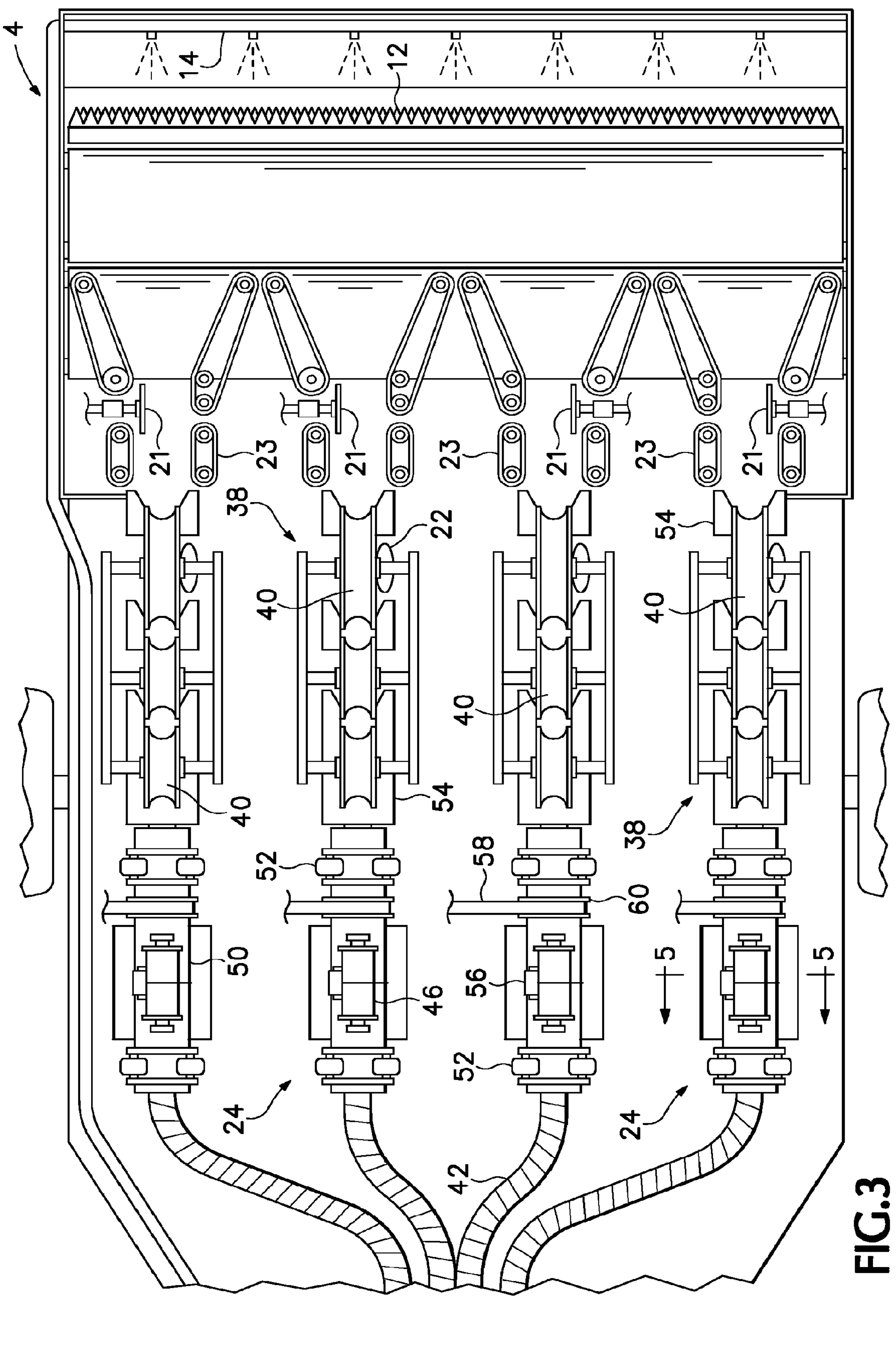
FIG. 3 is a top perspective of the front portion of a mobile straw beam fabricator of FIG. 1 showing four separate compression and first wrapper sections.

Referring to FIGS. 1, 2 and 3, a preferred embodiment of a mobile straw harvester and beam fabricator 2, in the form of a wheeled moveable apparatus, is divided into a front 4 and a rear 6 section. The front section 4 harvests straw and fabricates it into four strands 42 (FIG. 2), while the rear section 6 fabricates a beam 44 (FIG. 2) out of the four strands 42. The front section and hence the mobile straw harvester and beam fabricator 2 as a whole, is attached to a tractor by a hitch (not shown) and receives power from the tractor through a power take-off (not shown). In the preferred embodiment a tractor pulls the straw harvester 2 by the hitch through a field of straw capturing straw that has been left after the harvesting of grain heads. In an alternative embodiment, the harvester may be self propelled with its own engine. Other raw materials could, however, be used as a substitute. For example, bamboo, hemp, chaparral, or other organic substances with fibrous, cellulose-based, stem material could be used. Differing characteristics of the raw material would, of course, result in the production of a finished product whose characteristics, and thus uses, would differ from those obtained when straw is used.

As the tractor pulls the mobile straw harvester and beam fabricator 2 through a field of straw left after the harvesting of grain heads a cutter bar 12, or capturer, cuts and feeds the straw into the harvester. In an alternative embodiment the straw has already been cut and lies in the field in windrows. In such case only a pick-up belt would be needed instead of the cutter bar 12. Either way, both of these embodiments describe standard equipment for harvesting machines in the industry, which will be familiar to skilled persons.

Figure 4:
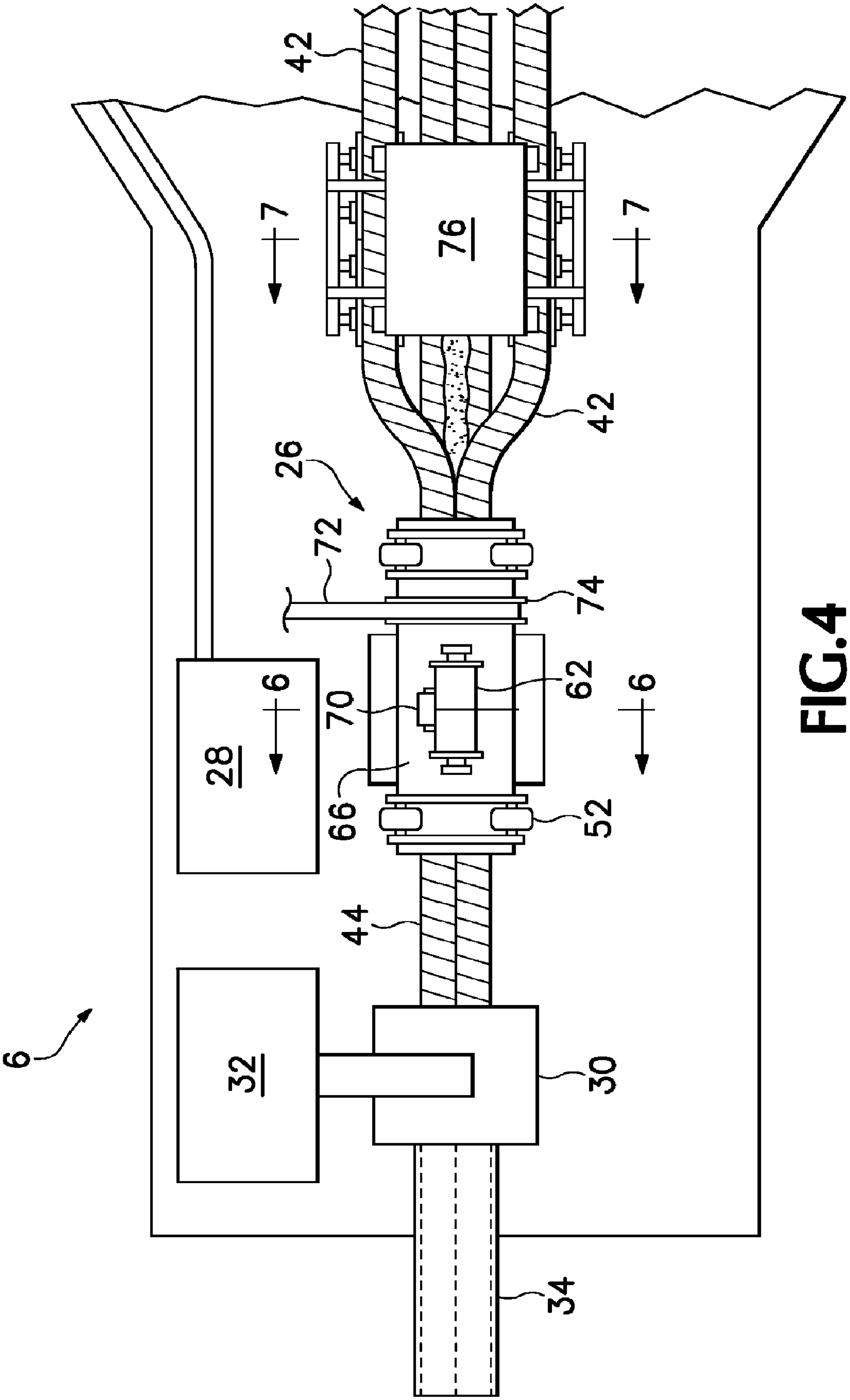
FIG. 4 is a top perspective of the rear portion of a mobile straw beam fabricator of FIG. 1 showing the adhesive injection section, the second wrapper section, and the extruder section.

When the feed stock (typically straw) is gathered into the harvester a hollow metal tube with multiple spray nozzles 14 sprays the straw with a matrix mixture that is held in, and pumped from, a reservoir 28 (FIGS. 1 and 4). The matrix mixture has both moisturizing and adhesive properties. The moisturizing properties are necessary so that the straw can be more easily compressed into a compact cylinder without damaging the structure of the material. The adhesive properties cause the straw to bind together more effectively during subsequent steps of the beam fabrication process.

Regulating the moisture so that the feed stock can be more easily compressed into a compact cylinder without damaging the structure of the material is an important element of the present embodiment. As noted in the background section, the structural qualities of straw, in its natural undamaged form, provide significant compressive strength. Compressive strength is precisely the type of strength needed in building materials that are used to support heavy loads. This is one great advantage this process has over the prior art.

In addition to the moisturizing value, the mixture that is sprayed onto the feedstock through the hollow tube with multiple spray nozzles 14 also has a binding element. Hence various binders such as clay, boiled linseed or soybean oil, rosin, as well as synthetic and natural adhesives may be part of the mixture that is sprayed onto the feed stock after it is cut and harvested.

After the feed stock is sprayed with the moisturizing and binding elements of the matrix mixture it is carried by a meshed feed belt 16 into one of four parallel compression sections 38. The feed belt is meshed to allow excess moisturizing and binding mixture to fall through to an over-spray tank (not shown) that catches the excess mixture for reuse.

Three movable vanes 18 separate the feed stock into four streams which enter into one of the four compression sections 38 by passing between a series of converging belts 20 that aligns, or arranges, the straw stems so that they are parallel to each other, and simultaneously compresses them so that they will feed into the compression rollers 40.

The compression sections 38 are preceded by four first flow limiting cutters 21 and four sets of parallel belts 23. The first flow limiting cutters 21 and parallel belts 23 limit the swath of feed stock entering the compression sections 38 according to the density of the swath. Greater densities require smaller widths and lesser densities require larger widths.

In an alternative embodiment the parallel belts 23 compress the straw stems from the top and bottom as well as from the sides. On three sides of the feed stock the belts 23 are fixed, while on the fourth side (top, bottom, or either side) one of the belts 23 is free to move (in a horizontal or vertical direction) to accommodate for changes in the volume of the material entering the compression process. Rollers may be used in the place of belts 23, depending on the material being processed.

After passing through the set of parallel belts 23, but before entering the compression rollers 40, a second flow limiting cutter 22 (FIGS. 2 and 3) removes more excess feed stock material and returns it to the field. Removing excess feed stock assures that only the desired volume of feed stock enters the compression rollers 40, and that the diameter of the resulting straw strand 42 (FIGS. 2 and 3) is uniform. It also prevents the compression rollers 40 from becoming overloaded. Returning excess feed stock to the field is also beneficial in the sense that it returns organic matter to the soil for the purpose of preserving tilth. Alternatively, the excess material can be further refined and added to the moisturizing and adhesive mixture.

Feed stock material next passes through the set of compression rollers 40, each of which has a transversely concave outer surface. The distance between the upper rollers 40 and the lower rollers 40 decreases progressively so that the feed stock is gradually compressed to the desired density and diameter.

During compression, the feed stock is held in place by a fixed roller die 54 made from a hard polymer resin (FIGS. 2 and 3). The roller die 54 guides the feed stock through the compression section and into the subsequent wrapper section. The roller die 54 is a guide block that is machined to be in contact with both the concave face of the rollers and the outer rim of the rollers. As such, the roller die assures that the straw material remains compressed within a columnar space and that no straw slides through the gap between the rollers, which would eventually lead to clogging up the system. The compression rollers 40 are able to drive the straw strand 42 through the roller die 54 because the friction created by the die 54 is less than the friction on the compression rollers 40.

Figure 5:
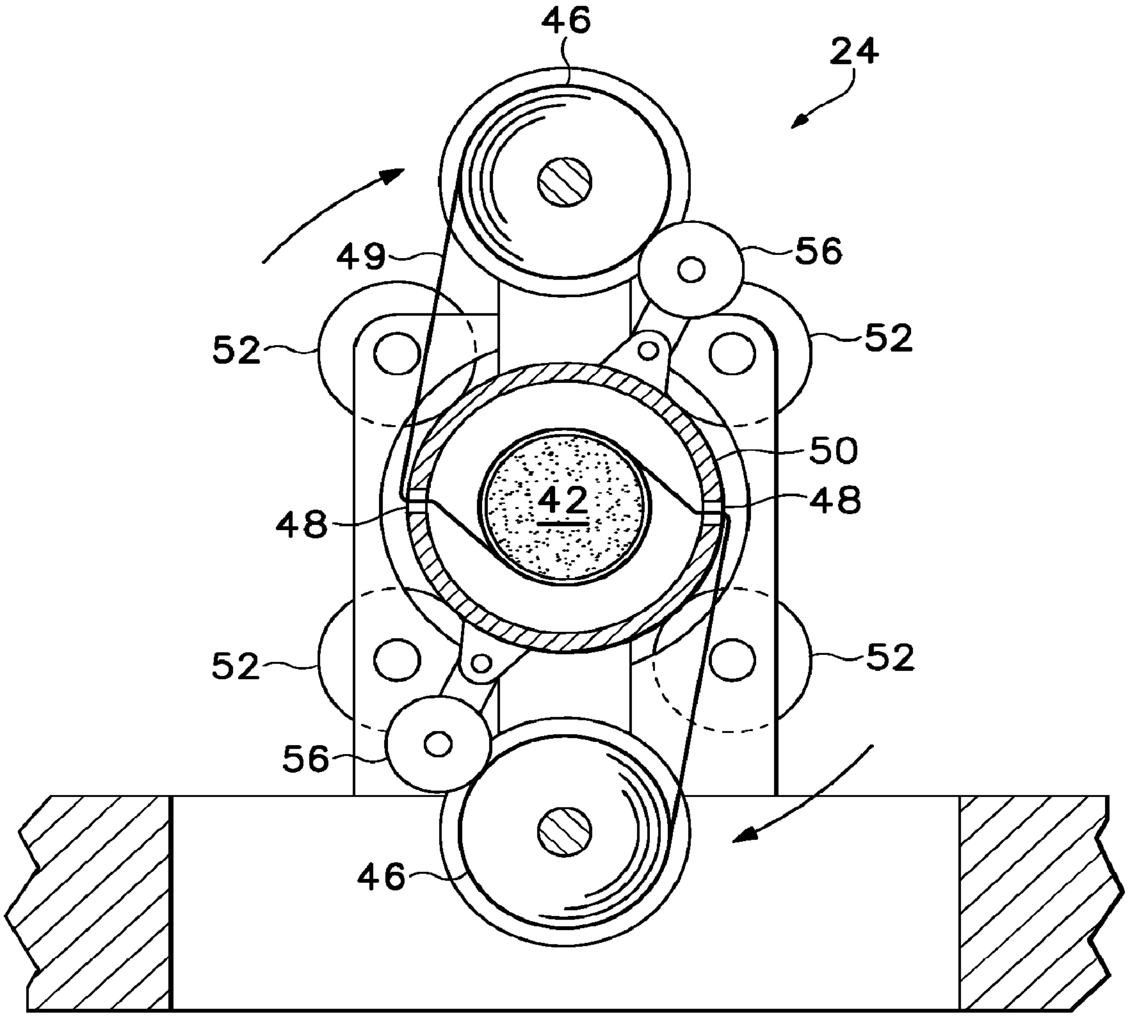
FIG. 5 is a cross section of a first wrapper section taken along line 5-5 of FIG. 3.
Figure 6:
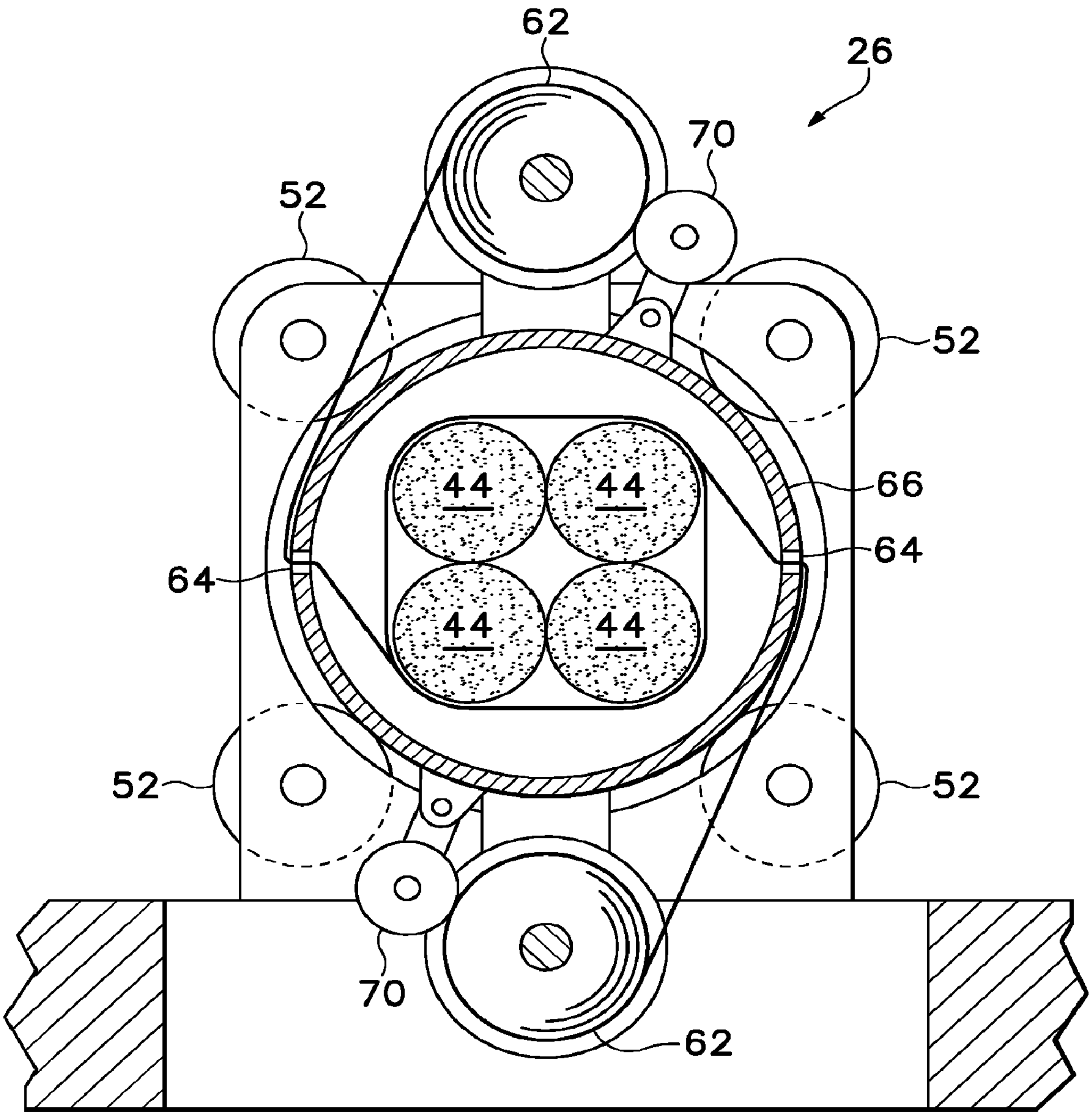
FIG. 6 is a cross section of the second wrapper section taken along line 6-6 of FIG. 4.

The resulting cylinder of feed stock is fed into the first wrapper, or binder, section 24 diagramed in FIGS. 2, 3, and 5. The first wrapper section entrance nozzle 47 is machined to mate with the exit of the roller die 54 so that the compressed straw column does not have space to expand before it passes into the first wrapper section 24. The first wrapper section 24 consists of a rotating assembly 50 holding two spools 46 of yarn, twine or wire 46 which, fed through an eyelet 48, is wound around the cylinder as it passes through the center forming a spiral wrapping which binds the material securely together. The tension of the yarn, twine or wire 49 (FIG. 5) is regulated by a tensioning roller 56. The rotating assembly 50 is supported in its frame by sets of rollers 52 at each end, and is powered by a drive belt 58 (FIG. 3) attached to the rotating assembly's drive belt pulley 60.

The result of the foregoing continuous process are four straw strands 42, one from each of the four first wrapper sections 24, each of equal diameter, which depending on the embodiment and setting may range from 1" to 9". Each strand 42 is bound together with a spiral wrapping of yarn, twine or wire. A twine made out of polyester yarn would work well with the preferred embodiment. Each straw strand 42 may next be fed from the front section 4 of the machine into a second stage, in the rear section 6 of the machine, where it will be combined with the three other strands 42 which are being formed simultaneously by the other three first wrapper sections 38.

FIG. 3 shows four separate compressing and wrapping units 38 mounted side-by-side in the front section 4 of the mobile straw harvester and beam fabricator. The width of the harvested swath necessary to accommodate four parallel wrapping units 38 would equal that made by harvesting equipment currently available. The four separate units 38 allow four streams of material to flow to the second, or beam fabrication, stage of the process in the rear section 6 of the machine.

Figure 7:
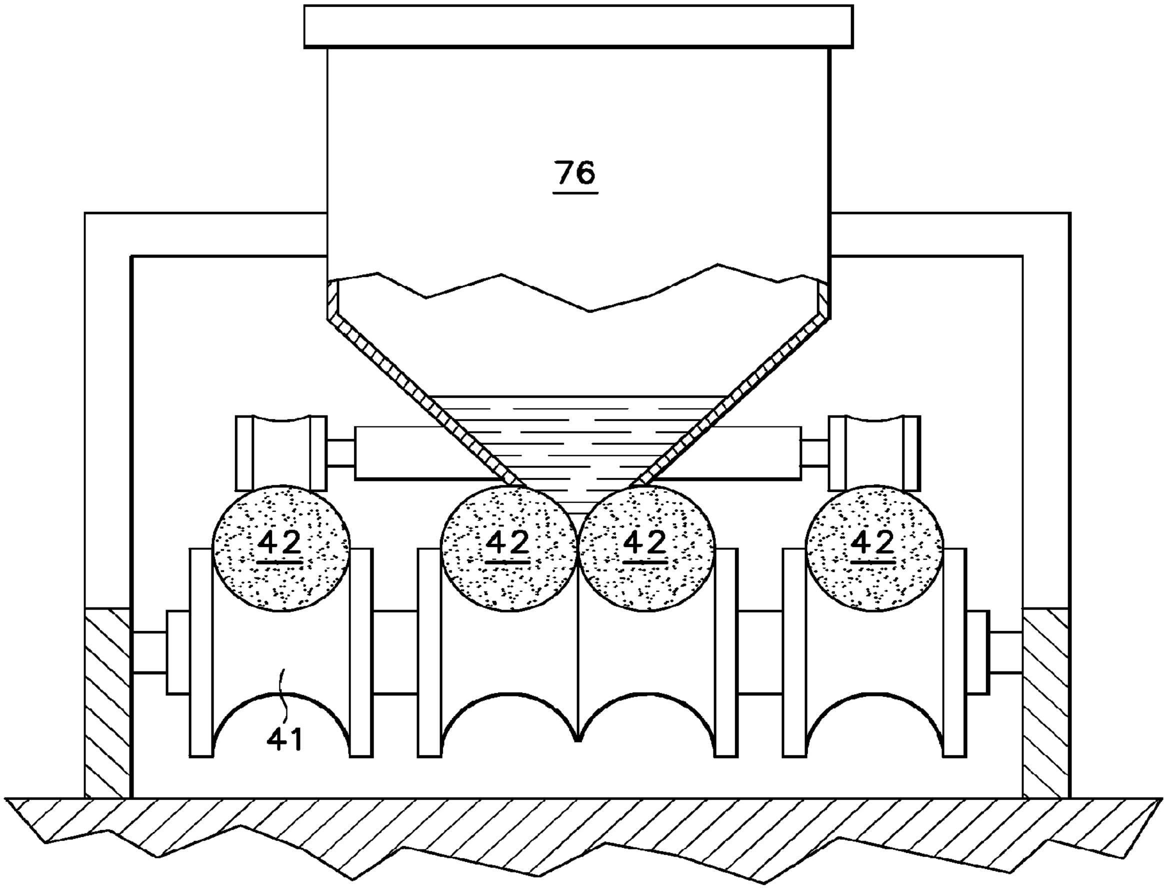
FIG. 7 is a cross section of the adhesive injection section taken along line 7-7 of FIG. 4.

In FIG. 7 we can see an optional adhesive injection section 76 (Also seen in FIGS. 1, 2 and 4) that the four straw strands 42 pass through before reaching the second wrapper section 26. The optional adhesive injection section 76 may be used to inject an adhesive mixture into what will become the core of the beam 44. This is done by pumping an adhesive mixture between the middle two strands 42 when the four strands 42 are still parallel and grouped together horizontally on the aligning rollers 41. After exiting the optional adhesive section 76, but before entering the second wrapper section 26, the outer two strands 42 are raised up by beam forming rollers (not shown for ease of presentation) and brought together on top of the idle inner strands 42 so that the adhesive mixture is in between the four strands 42.

When the four strands 42 are wrapped together in the second wrapper section 26 the adhesive will serve to bind the four straw strands 42 together more securely. In the mobile unit the adhesive mixture is pumped from a rear tank 32. In an alternative, stationary, unit a gravity fed system is used, saving the expense of a pump. The adhesive mixture may be a papercrete mixture consisting of paper pulp, clay, Portland cement, straw fiber and other adhesive materials.

In the rear section 6 of the mobile straw harvester and beam fabricator 2 the four straw strands 42 are fed into the second, and subsequent, wrapper, or binder, section 26 which is shown in FIGS. 1, 2, 4 and 6. The second wrapper section 26 works on the same principles as the first wrapper sections 24 except that, having a larger diameter, the second wrapper section is capable of accommodating the greater volume created by combining the four straw strands 42 from the four first wrapper section units. The four straw strands 42, pass through the rotating assembly 66, and are bound together into a single beam 44 (FIG. 2) by yarn, twine or wire held on one or more spools 62 held by the rotating assembly 66 and fed through an eyelet 64. The rotating assembly 66 is supported in its frame by sets of rollers 52 at each end. The second wrapper section may be powered, as the first sections are, by a drive belt 72 (FIG. 4) attached to a drive belt pulley 74 that is connected to the rotating assembly 66 or, alternatively, it may be powered by a drive chain attached to a drive chain sprocket connected to the rotating assembly 66.

Referring to FIGS. 2 and 4, the beam 44 then passes into an extruder, or finishing, section 30 where four concave traction rollers (not shown), oriented at 90 degree angles, square the beam and simultaneously eliminate unwanted moisture through compression. The squared beam 44 is then coated on one or more sides with a uniform, approximately 0.5" layer of exterior plaster, or fiber adobe, composed of the same adhesive mixture of paper pulp, clay, Portland cement, and other adhesive materials that was previously injected into the core. The exterior plaster is pumped from tank 32 and placed upon the beam by a nylon trowel (not shown).

After passing through the extruder, or finisher, 30 the beam 44 enters a vibrating trowel 34 which further compresses and smoothes the fiber adobe exterior plaster. This assures that a good bond is formed between the beam and the fiber adobe coating. The completed beam is then deposited from the rear of the machine into the field to dry. When the beam dries, it can be cut to length and transported. Alternatively, a saw could be placed at the rear of the machine, before or after the vibrating trowel 34, to cut the beam into predetermined lengths before depositing the cut beams into the field.

The entire process allows a predetermined percentage of straw to be left in the field to preserve the required content of organic matter in the soil. Neither burning nor bailing is able to accomplish this.

The finished beam, properly dried, can either be maintained in its continuous state for such purposes as erosion control, or restoration of fish habitat in streams, etc., or can be cut for use as construction beams and used for such purposes as the construction of load bearing walls.

In an alternative embodiment the machine would be stationary and located at a central location to which the raw material could be transported. The raw material would then be fed into the beam fabricator either by hand, or through some sort of automatic feed. This alternative would be particularly relevant where mechanical harvest is not available, or the particular raw material being used does not lend itself to mechanical harvest.

In another alternative embodiment the feed mechanism could be made larger to accommodate brush and other more rigid materials. Additional rotating saw blades would trim off branches that could not be compressed. The compression and wrapper assemblies would also have to be larger to accommodate the strands and beams that would be fabricated.

The terms and expressions that have been employed in the foregoing specification are used as terms of description and not of limitation. There is no intention, in the use of such terms and expressions, of excluding equivalents of the features shown and described or portions thereof, it being recognized that the scope of the invention is defined and limited only by the claims which follow.

The invention claimed is:

1. A method for creating a building material:

(a) providing a wheeled, moveable apparatus;

(b) moving said apparatus through a field having agricultural product pieces;

(c) capturing a portion of said agricultural product pieces onto said apparatus, as it is moved through said field;

(d) aligning said captured agricultural product pieces, on said apparatus, to create aligned product pieces;

(e) binding a plurality of said aligned agricultural product pieces together by a spiral wrapping, on said apparatus to create a strand of spiral wrapped agricultural product pieces, and binding together an additional plurality of aligned agricultural product pieces to form a plurality of strands of agricultural product pieces;

(f) wrapping said plurality of strands together, on said apparatus, to form a wrapped plurality of agricultural product pieces strands; and (g) adding cementatious material to said wrapped plurality of agricultural product pieces strands, on said apparatus, to form a cemented piece of building material, suitable for bearing loads.

2. The method of claim 1, wherein said agricultural product is straw.

3. The method of claim 1, wherein said agricultural product pieces are compressed before they are bound, so that the result is plurality of agricultural product pieces that are bound together in a state of being compressed together.

4. The method of claim 1, wherein a cementatious material is placed in the center of said bound group of strands.

5. The method of claim 1, wherein the cementatious material is composed of a papercrete mixture consisting of paper pulp, clay, Portland cement, straw fiber and other adhesive materials.

6. The method of claim 1, wherein said agricultural product pieces are waste product pieces.

7. The method of claim 1, wherein said agricultural product pieces have a natural structure and wherein this natural structure is preserved during said method.

* * * * *